(12) United States Patent
Atieh et al.

(10) Patent No.: US 8,069,469 B1
(45) Date of Patent: Nov. 29, 2011

(54) ADDRESSING SECURITY IN ASYMMETRICAL NETWORKS

(75) Inventors: Ezzat Atieh, Olathe, KS (US); Mohammed Mohiuddin, Overland Park, KS (US); Reza Jafari, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 693 days.

(21) Appl. No.: 12/179,921

(22) Filed: Jul. 25, 2008

(51) Int. Cl.
*H04L 9/32* (2006.01)
(52) U.S. Cl. .................................. 726/2; 726/3
(58) Field of Classification Search .................. 726/1–4, 726/10–14; 713/150, 154, 168–171; 709/223–225
See application file for complete search history.

(56) References Cited

U.S. PATENT DOCUMENTS

| | | | |
|---|---|---|---|
| 5,941,988 A * | 8/1999 | Bhagwat et al. | 726/12 |
| 6,598,167 B2 * | 7/2003 | Devine et al. | 726/8 |
| 2006/0191003 A1 | 8/2006 | Bahk | |
| 2006/0268932 A1 | 11/2006 | Singh | |

OTHER PUBLICATIONS

Mirkovic, Jelena; "D-Ward: Source-End Defense Against Distributed Denial-of-Service Attacks;" Dissertation; University of California, Los Angeles; 2003, 396 pp.
Lim, Boonping; Uddin, Safi; "Statistical-based SYN-flooding detection using programmable network processor;" Symposium; Information Technology and Applications, 2005; ICTA 2005, 21 pp.
Linehan, Eamonn, "Internet Worm Detection as part of a Distributed Network Inspection System," Dissertation; University of Dublin, 2004, 127 pp.

* cited by examiner

*Primary Examiner* — Hosuk Song

(57) ABSTRACT

Embodiments of the present invention provide systems, methods and apparatuses for addressing security by keeping track of handshake messages received by security elements along paths in an asymmetrical network. An Intelligent Security System receives handshake messages, thereby determining whether a session is allowed, and communicating information about the handshake messages, associations, and allowed sessions, to the security elements.

10 Claims, 8 Drawing Sheets

ADDRESSING SECURITY IN ASYMMETRICAL NETWORKS

SUMMARY

Embodiments of the invention are defined by the claims below, not this summary. A high-level overview of embodiments of the invention are provided here for that reason, to provide an overview of the disclosure.

Embodiments of the present invention provide systems, methods and apparatuses for addressing security by keeping track of handshake messages associated with sessions and attempts to establish sessions in an asymmetrical network. In an asymmetrical network, handshake messages associated with an attempted session may travel along different paths. Embodiments of the present invention provide an Intelligent Security System that communicates with security elements placed along paths in the network, keeping track of handshake messages received by the security elements. The Intelligent Security System makes associations among the handshake messages, thereby determining whether a session is allowed, and communicating information about the handshake messages, associations, and allowed sessions, to the security elements.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
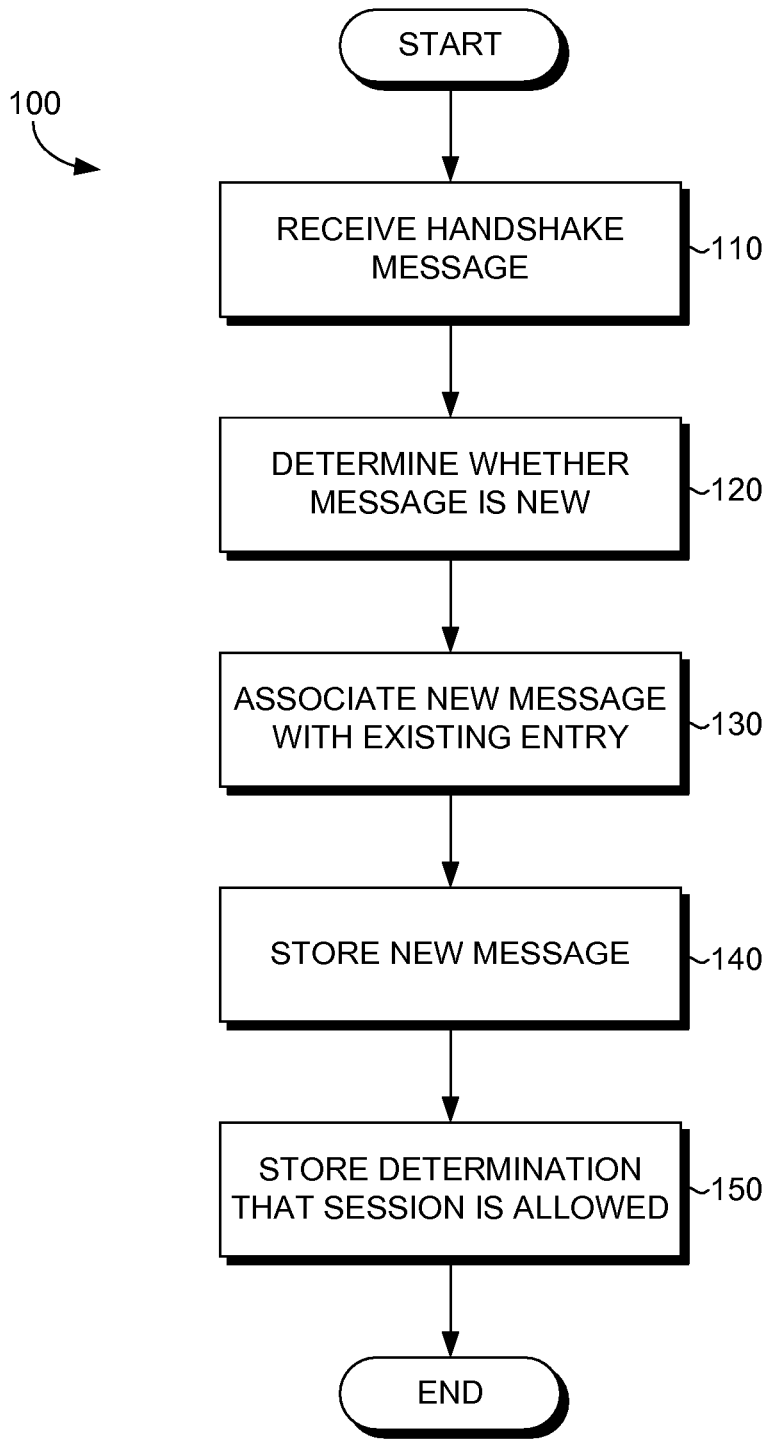
FIG. 1 depicts a flow chart illustrative of an exemplary method in accordance with an embodiment of the present invention.

Embodiments of the present invention provide systems, methods and apparatuses for addressing security in an asymmetrical network. Associations are made between handshake messages that travel along separate paths in a network.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| ACK | Acknowledgement Packet |
| CD-ROM | Compact Disc read-only memory |
| EEPROM | Electrically Erasable Programmable Read-Only Memory |
| DVD | Digital Versatile Disc |
| FIN | Finish Packet |
| ISS | Intelligent Security System |
| RAM | Random Access Memory |
| ROM | Read Only Memory |
| SYN | Synchronization Packet |
| SYN-ACK | Acknowledgment and Synchronization Packet |
| TCP | Transmission Control Protocol |

Further, various technical terms are used throughout this description. An illustrative resource that fleshes out various aspects of these terms can be found in *Newton's Telecom Dictionary* by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In a TCP network, a three-way handshake may be required in order to establish a communication session. The three-way handshake may consist of a SYN message (also referred herein as SYN), a SYN-ACK message (also referred herein as SYN-ACK) and an ACK message (also referred herein as ACK). For example, a client wishing to establish a session may send a SYN to a server. When the server receives the SYN, it responds by sending a SYN-ACK to the client. When the client receives the SYN-ACK, it then transmits an ACK to the server and the session is established.

The client and the server may associate the SYN, SYN-ACK, and ACK handshake messages with a specific attempt to establish a session based on sequence numbers and acknowledgement numbers contained within the handshake messages. For example, the initial SYN message from the client contains a sequence number, which is incremented by the server and returned in the SYN-ACK message as an acknowledgement number. The SYN-ACK also contains a sequence number of its own from the server. In response to the SYN-ACK, the ACK message from the client contains the next sequence number that would follow the sequence number of the initial SYN from the client. In this way, the client and server assure that a series of handshake messages refers to a single attempted session.

One way in which a malicious party may attack a network is to send one or more handshake messages which are not associated with any actual attempt to establish a session. For instance, flooding a server with SYNs can cause the server to initiate the process of opening a session each time a SYN is received. However, when the server sends SYN-ACK messages in response to those SYNs, no ACK messages are ever received back from a client because the SYNs contained erroneous client addresses. Thus, the server becomes overloaded in responding to the illegitimate SYNs and waiting for responses that never come.

A symmetrical network is one in which all communication for a given session travels along the same path in either direction. In a symmetrical network, one means of guarding against an attack may be to place a security element on each path in the network. Each security element monitors the packets, messages, and the like, which travel along its associated path. The security element keeps track of the handshake messages that are received, as well as any data packets that are received along the path. As a security element receives a SYN, a SYN-ACK or an ACK, it keeps track of the handshake message in a local session table and associates it with other handshake messages that correspond to a same attempt to establish a session. When the security element has received all of the handshake messages associated with a session, it then knows that the session is allowed and will allow data packets associated with the session to pass through.

When a new handshake message is received that is not associated with an entry in the local session table, the security elements generates an entry for that handshake message and allows the handshake message to pass through. However, if the handshake message already has an entry in the session table, the security element drops the packet. When the security element receives a handshake message that is associated with an entry in the session table, the security element updates the entry to reflect that the associated handshake message has been received, and allows the associated handshake message to pass through. If a session associated with the handshake messages is not established within a specified period of time, then the security element removes the associated entry from the session table.

This methodology prevents a large flood of erroneous session requests from being passed along to a server. However, one drawback with this method of addressing security is the fact that it applies only to symmetrical networks. Because all communication for a given session travels the same path, the security element on that path sees all handshake messages and data packets associated with that session.

On the other hand, an asymmetrical network is one in which the handshake messages and the data packets may travel different paths through the network. In other words, a SYN message may travel along one path, however, when the server responds with a SYN-ACK message, that message may travel to the client along a different path. Thus, a first security element may receive the SYN associated with a session, a second security element may receive the SYN-ACK associated with the session, and the first security element may receive the ACK associated with the session. Because the first security element never receives all three handshake messages for a session, it believes that the SYN message was erroneous and the session request is allowed to timeout and no further packets relating to that session or attempted session will be allowed to pass by the security element. Likewise, the second security element receives only a portion of the handshake messages for the session, and allows the session attempt to time out. The result, then, of using this method in an asymmetrical network is that legitimate packets are erroneously dropped and legitimate sessions are not allowed to be established.

Embodiments of the present invention provide systems, methods and apparatuses for addressing security in asymmetrical networks. In an embodiment of the present invention, an Intelligent Security System (ISS) communicates with a plurality of security elements in an asymmetrical network. The ISS may be a computing platform, a database, or any combination of devices, systems or programs that are configured to perform tasks associated with embodiments of the present invention.

In an embodiment of the present invention, the ISS receives notifications from the security elements when they receive handshake messages. The ISS generates and updates entries, associated with the handshake messages, in a centralized session table. Even though each handshake message for a session may travel a different path in the network, the ISS knows all of them and can associate handshake messages received by one security element with handshake messages received by another security element. Thus, the ISS determines when a session is established based on associations between handshake messages received from a plurality of security elements in the network. Further, the ISS communicates to the security elements that a session is allowed or not allowed.

In an embodiment of the present invention, in addition to functioning as previously described for a symmetrical network, the security elements additionally communicate the received handshake messages, or notifications corresponding to the received handshake messages, to the ISS. When a security element receives a handshake message, it determines whether there are any entries in its local session table associated with the handshake message. If not, it additionally determines whether there are any entries in the ISS centralized session table associated with the handshake message. A security element may be a computing platform, a database, or any combination of devices, systems or programs that are configured to perform tasks associated with a security element in embodiments of the present invention Likewise, a local session table may be a computing platform, a database, or any combination of devices, systems or programs that are configured to perform tasks associated with a local session table in embodiments of the present invention. A local session table may be external to, incorporated within, coupled with, or otherwise communicate with, a security element.

Referring to the drawings in general and initially to FIG. 1 in particular, a flow chart illustrates an exemplary method suitable for use in implementing embodiments of addressing security in asymmetrical networks and is designated generally as a security method 100. The security method 100 is but one example of a suitable security method and is not intended to suggest any limitation as to scope of use or functionality. Neither should the security method 100 be interpreted as having any dependency or requirement relating to any one or combination of components or modules illustrated.

At a step 110 of FIG. 1, at least one of a plurality of handshake messages is received at a centralized database from a plurality of security elements. In an embodiment of the present invention, an asymmetrical network may have a security element on, or coupled with, each path within the network. Preferably, the security element lies only on one path of the asymmetrical network, and each path includes one or more security elements. Other embodiments may have security elements associated with only some paths in the asymmetrical network. The centralized database may be a computing platform, a database, or any combination of devices, systems or programs that are configured to perform tasks associated with a centralized database in embodiments of the present invention.

At a step 120 of FIG. 1, at the centralized database, a determination is made as to whether the received handshake message is new to the centralized database. In some embodiments, the centralized database is scanned, reviewed, or otherwise analyzed to see if the received handshake message has already been entered into the centralized database.

At a step 130, a handshake message that is new to the database is associated with an existing entry in the centralized database. In embodiments of the invention, the association may be based on information contained in the handshake message and information received in a previous handshake message stored in the existing entry. This may include, but is not limited to, such information as source address, destination address, sequence numbers, acknowledgement numbers, and identification of an attempted session. Exemplary ways of generating associations within a database may include linkages, flags, updates to entries, and the like. One skilled in the art can appreciate these and various other inexhaustible ways in which to generate associations in a database.

Continuing at a step 140, the new handshake message is stored in the centralized database and, at a step 150, a determination that a session is allowed is stored in the centralized database, based on the association of the new handshake message to the existing entry. In some embodiments, information about the new handshake message may be stored in the centralized database, either instead of or in addition to, the handshake message itself.

Figure 2:
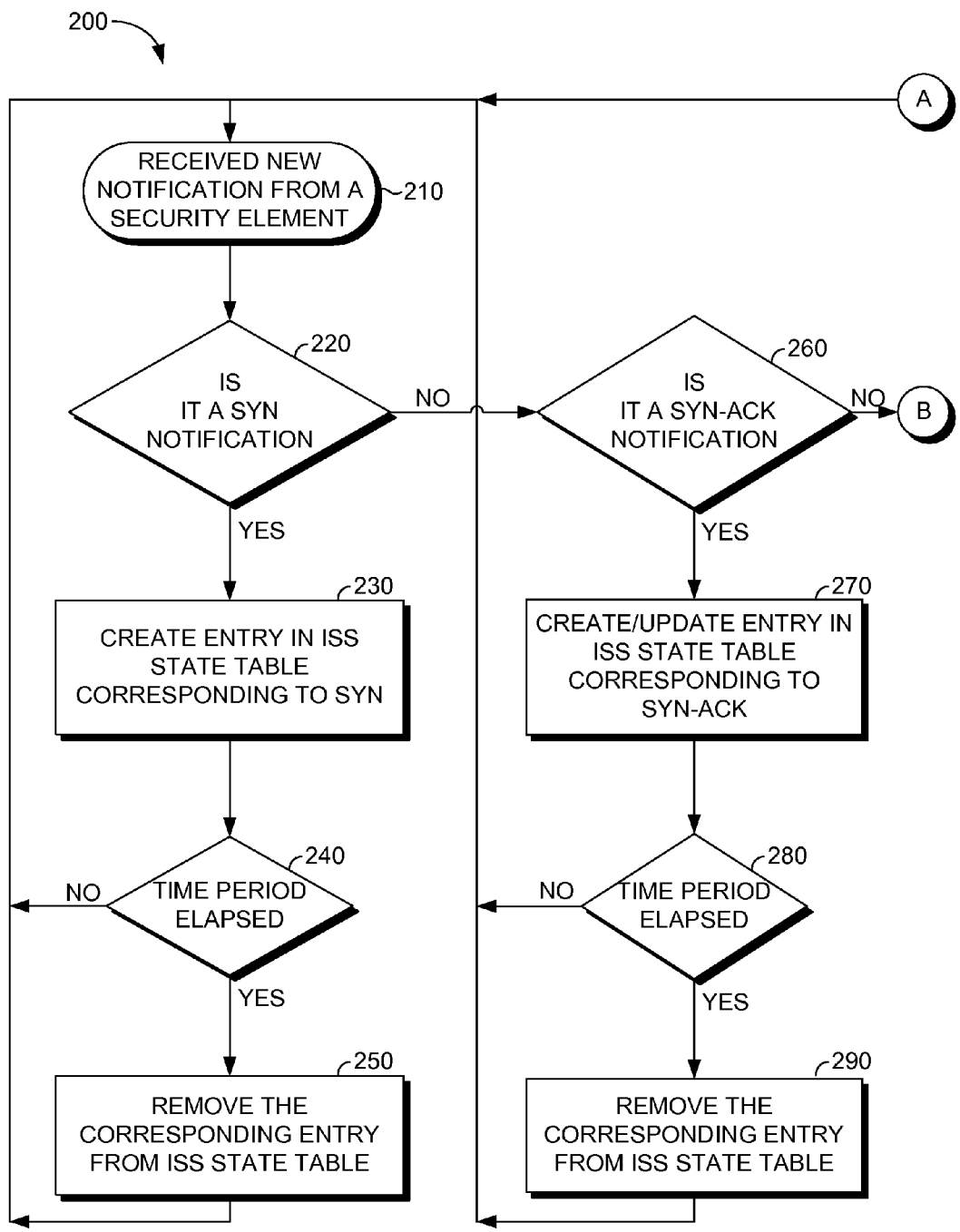
FIG. 2 and FIG. 3 together depict a flow chart illustrative of an exemplary method in accordance with an embodiment of the present invention.
Figure 3:
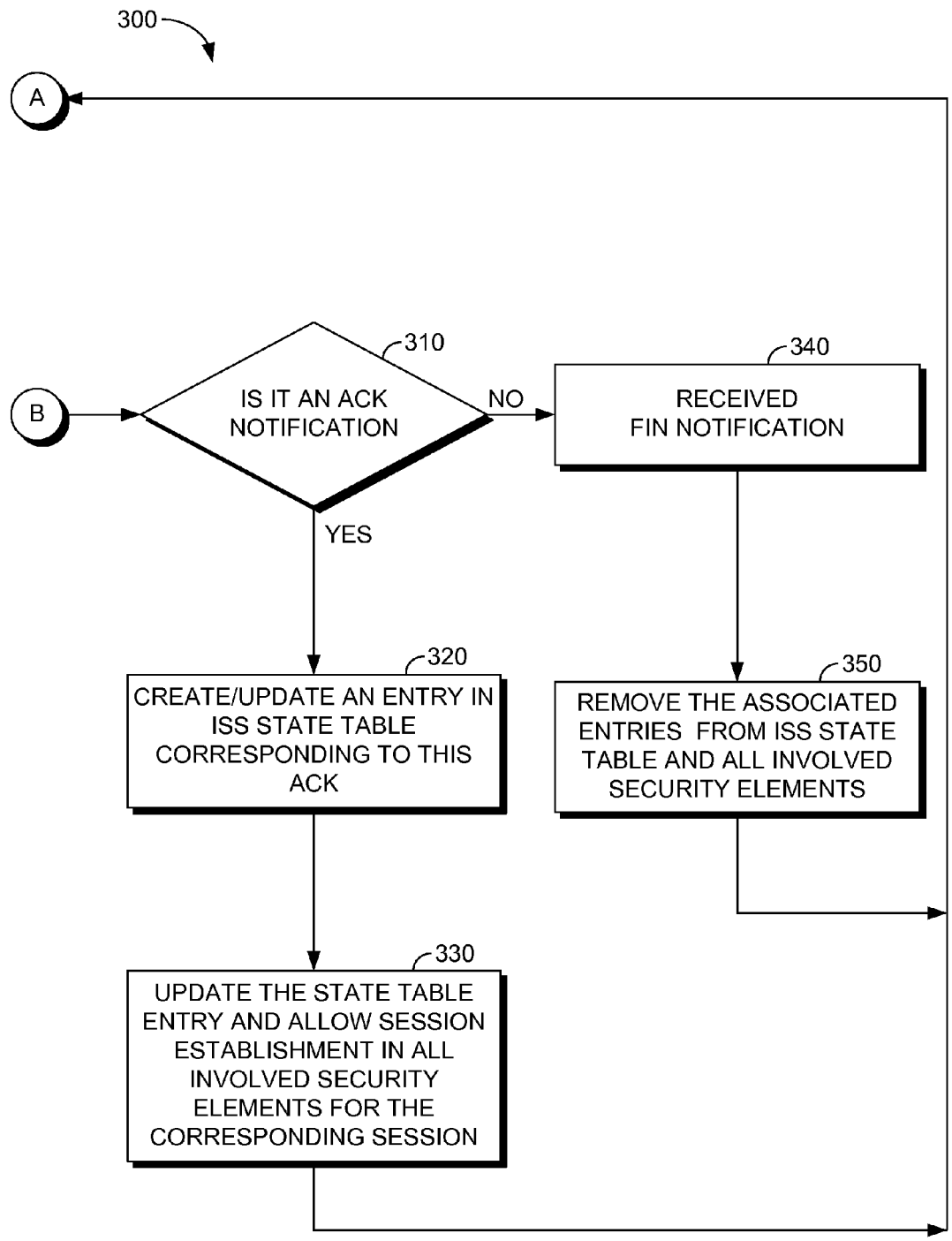

Referring now to FIG. 2 and FIG. 3, a flow chart is depicted, illustrating an exemplary method which may be used in an embodiment of addressing security in an asymmetrical TCP-based network. FIG. 2 and FIG. 3 may be placed side-by-side, forming one continuous flow chart. Points A and B on FIG. 2 correspond respectively to points A and B on FIG. 3. FIG. 2 and FIG. 3 are generally referred to as security method 200 and security method 300. The security methods 200 and 300 are but examples of suitable security methods and are not intended to suggest any limitation as to scope of use or functionality. Neither should the security methods 200 and 300 be interpreted as having any dependency or requirement relating to any one or combination of components or modules illustrated.

In one embodiment, security methods 200 and 300 may be incorporated into an Intelligent Security System (ISS). The ISS may be a computing platform, a database, or any combination of devices, systems or programs that are configured to perform tasks associated with embodiments of the present invention. The ISS may communicate with a plurality of security elements in the network. As a security element receives a handshake message, it sends a notification of that message to the ISS, which tracks all of the handshake messages and associates them with other handshake messages and with the security elements at which they were received. In embodiments of the present invention, notifications, tracking, handshake messages and associations, may be stored in a state table or session table. A state table or session table may be a computing platform, a database, or any combination of devices, systems or programs that are configured to perform tasks associated with a state table or session table in embodiments of the present invention. A state table or session table may be external to, incorporated within, coupled with, or otherwise communicate with, the ISS.

Continuing now with FIG. 2 at a step 210, at the ISS, a new notification is received from a security element of a SYN message, a SYN-ACK message, or an ACK message. At a step 220 a determination is made as to whether it is a SYN notification. If it is a SYN notification, then at a step 230, an entry is generated in the ISS state table or session table corresponding to the SYN, and associating it with a security element from which it was received, and also associating it with an attempt to establish a session. In an embodiment, a state table or session table is configured to include entries associated with established sessions, attempted sessions, and associated handshake messages that have or have not been received. At a step 240, if the session is not successfully established within a certain period of time, then at a step 250 the entry corresponding to this SYN message will be removed from the ISS state table. Exemplary ways of generating associations may include linkages, flags, updates to entries, and the like. One skilled in the art can appreciate these and various other inexhaustible ways in which to generate associations in a database.

At the step 220, if it is determined that the received notification is not a SYN notification, then at a step 260 a determination is made as to whether the notification is a SYN-ACK notification. If the notification is a SYN-ACK notification, then at a step 270, an association will be made between the SYN-ACK notification and an existing entry in the ISS state table. In embodiments of the invention, the association may be based on information contained in the SYN-ACK notification and information received in a previous handshake notification stored in the existing entry. This may include, but is not limited to, such information as source address, destination address, sequence numbers, acknowledgement numbers, and identification of an attempted session. If such an association is found, then the entry in the ISS state table will be updated to reflect the notification of this SYN-ACK message. If no such association is found, then an entry will be generated in the ISS state table, reflecting the SYN-ACK notification. At a step 280, if the session associated with the SYN-ACK notification is not established within a certain time period, then the entry will be removed from the ISS state table at a step 290.

At the step 260, if it is determined that the notification is not a SYN-ACK notification, then at a step 310 in FIG. 3, a determination will be made as to whether the notification is an ACK notification. If the notification is an ACK notification, then an association will be made between the ACK notification and an existing entry in the ISS state table at a step 320. In embodiments of the invention, the association may be based on information contained in the ACK notification and information received in a previous handshake notification stored in the existing entry. This may include, but is not limited to, such information as source address, destination address, sequence numbers, acknowledgement numbers, and identification of an attempted session. If such an association is found then the entry of the ISS state table will be updated to reflect the receipt of the ACK notification. If no such association is found then a new entry will be generated in the ISS state table, reflecting the receipt of the ACK notification.

Continuing at a step 330, the state table entry will then be updated to indicate that a session is allowed to be established and all security elements receiving the handshake messages associated with that session will be notified. In embodiments of the present invention, notifying a security element may be initiated by the ISS or by the security element.

At the step 310 in FIG. 3, if it is determined that the notification is not an ACK notification, then it is determined at a step 340 that the notification is a FIN notification, which indicates that the session is to be terminated. At a step 350, the associated entries are removed from the ISS state table and from all security elements that received the associated handshake messages, thus terminating the session. In embodiments of the present invention, removing the associated entries from a security element may be performed by the ISS or by the security element.

Figure 4:
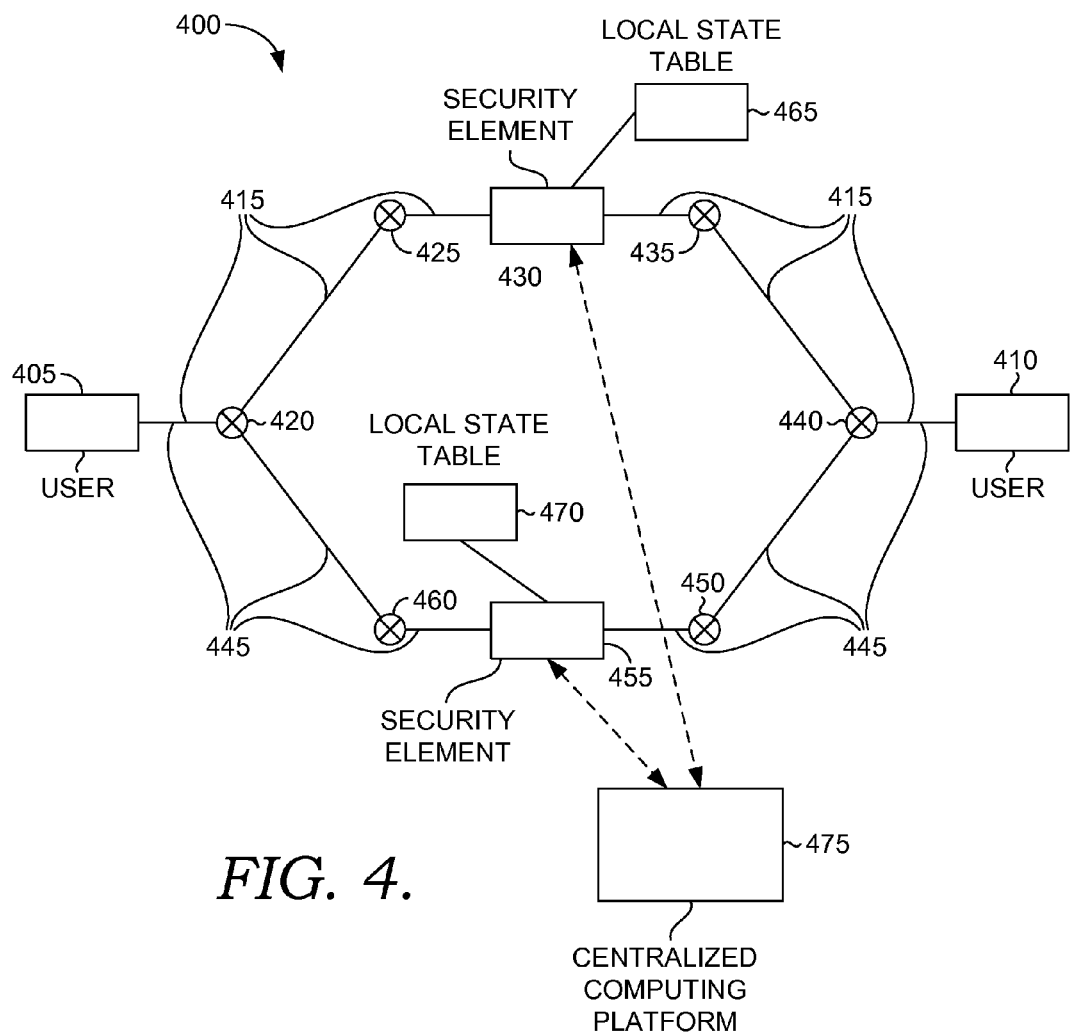
FIG. 4 depicts an exemplary system in accordance with an embodiment of the present invention.

Referring now to FIG. 4, an exemplary system is depicted which may be used in implementing embodiments of the present invention and generally referred to as asymmetrical security system 400. The asymmetrical security system 400 is but one example of a suitable asymmetrical security system and is not intended to suggest any limitation as to scope of use or functionality. Neither should the asymmetrical security system 400 be interpreted as having any dependency or requirement relating to any one or combination of components or modules illustrated.

Communication between a user 405 and a user 410 occurs along two paths within the asymmetrical security system 400. Exemplary users 405 and 410 may be a client, a server, or any other type of device, system or program that communicates over a network. Path 415 travels from user 405 to router 420, then to router 425, then to security element 430, then to router 435, then to router 440, and then to user 410. Path 445 travels from user 410 to router 440, to router 450, to security element 455, to router 460, to router 420, then to user 405. It should be noted that packets may travel in either direction on either path, and that these paths are exemplary. Any number and forms of paths are contemplated with this invention. However, for this example, packets traveling between user 405 and user 410 will travel along separate paths, depending upon the direction in which they are traveling.

Security element 430 is coupled with a local state table 465. Likewise, security element 455 is coupled with a local state table 470. In embodiments of the present invention, a security element may be physically or logically coupled with a local state table. Security elements 430 and 455 may be computing platforms, databases, or any combination of devices, systems or programs that are configured to perform tasks associated with security elements in embodiments of the present invention. Likewise, a local state table may be a computing platform, a database, or any combination of devices, systems or programs that are configured to perform tasks associated with a local state table in embodiments of the present invention. A local state table may be external to, incorporated within, coupled with, or otherwise communicate with, a security element.

A centralized computing platform 475 communicates with security element 455 and security element 430. The centralized computing platform 475 may be a computing platform, a database, or any combination of devices, systems or programs that are configured to perform tasks associated with a centralized computing platform in embodiments of the present invention. The centralized computing platform 475 tracks the handshake messages that are received by the security elements. This enables the centralized computing platform 475 to determine whether a session is allowed based on associations between the handshake messages received at the various security elements. Exemplary ways of tracking handshake messages and associations may include linkages, flags, updates to entries, and the like. One skilled in the art can appreciate these and various other inexhaustible ways in which to track handshake messages and associations.

For example, user 405 may attempt to initiate a session with user 410. User 405 sends a SYN message to user 410. The SYN message travels along path 415 to router 420, then to router 425, and then to security element 430. Upon receiving the SYN message, security element 430 stores an entry in local state table 465, corresponding to the received SYN message. Security element 430 also communicates the received SYN message to the centralized computing platform, which stores an entry of its own in a centralized state table, thus keeping track of the handshake messages received by security element 430. A centralized state table may be a computing platform, a database, or any combination of devices, systems or programs that are configured to perform tasks associated with a centralized state table in embodiments of the present invention. A centralized state table may be external to, incorporated within, coupled with, or otherwise communicate with, the centralized computing platform.

Security element 430 then passes the received SYN message along path 415 to router 435, then to router 440, and then to user 410. User 410 responds with a SYN-ACK message, which travels along path 445 to router 440, then to router 450, and then to security element 455. Security element 455 stores an entry in locate state table 470, indicating the receipt of the SYN-ACK message. Security element 455 also communicates to the centralized computing platform 475 the receipt of the SYN-ACK message. Security element 455 then allows the SYN-ACK message to pass along path 455 to router 460, then to router 420, and then to user 405.

User 405 then responds with an ACK message, which travels along path 415 to router 420, then to router 425, and then to security element 430. Security element 430 stores, in the local state table 465, the reception of the ACK message associated with the previous entry of the SYN message. Security element 430 also communicates the reception of the ACK message to the centralized computing platform 475. Security element 430 then allows the ACK message to pass along path 415 to router 435, then to router 440, and then to user 410.

The centralized computing platform 475, upon receiving notification of the SYN message, the SYN-ACK message and the ACK message from the security elements 455 and 430, stores an indication in its state table that a session has been established and notifies security element 455 and security element 430 that the session associated with those handshake messages has been established. In embodiments of the present invention, notification of a security element may be initiated by the centralized computing platform 475 or by the security element.

Continuing now with FIGS. 5, 6, 7, and 8, a flow chart is depicted illustrating an exemplary method that may be used in embodiments of the present invention. FIGS. 5, 6, 7, and 8 may be placed side-by-side forming one continuous flow chart. Points C, D, E, and F on FIG. 5 correspond respectively to points C, D, E, and F of FIG. 6. Points G, H, and I of FIG. 6 correspond respectively to points G, H, and I of FIG. 7. Points J, K, L, M, and N of FIG. 7 correspond respectively to Points J, K, L, M, and N of FIG. 8.

The method of FIGS. 5, 6, 7, and 8 is generally referred to as security method 500, security method 600, security method 700 and security method 800. The security methods 500, 600, 700 and 800 are but examples of suitable security methods and are not intended to suggest any limitation as to scope of use or functionality. Neither should the security methods 500, 600, 700 and 800 be interpreted as having any dependency or requirement relating to any one or combination of components or modules illustrated.

Figure 5:
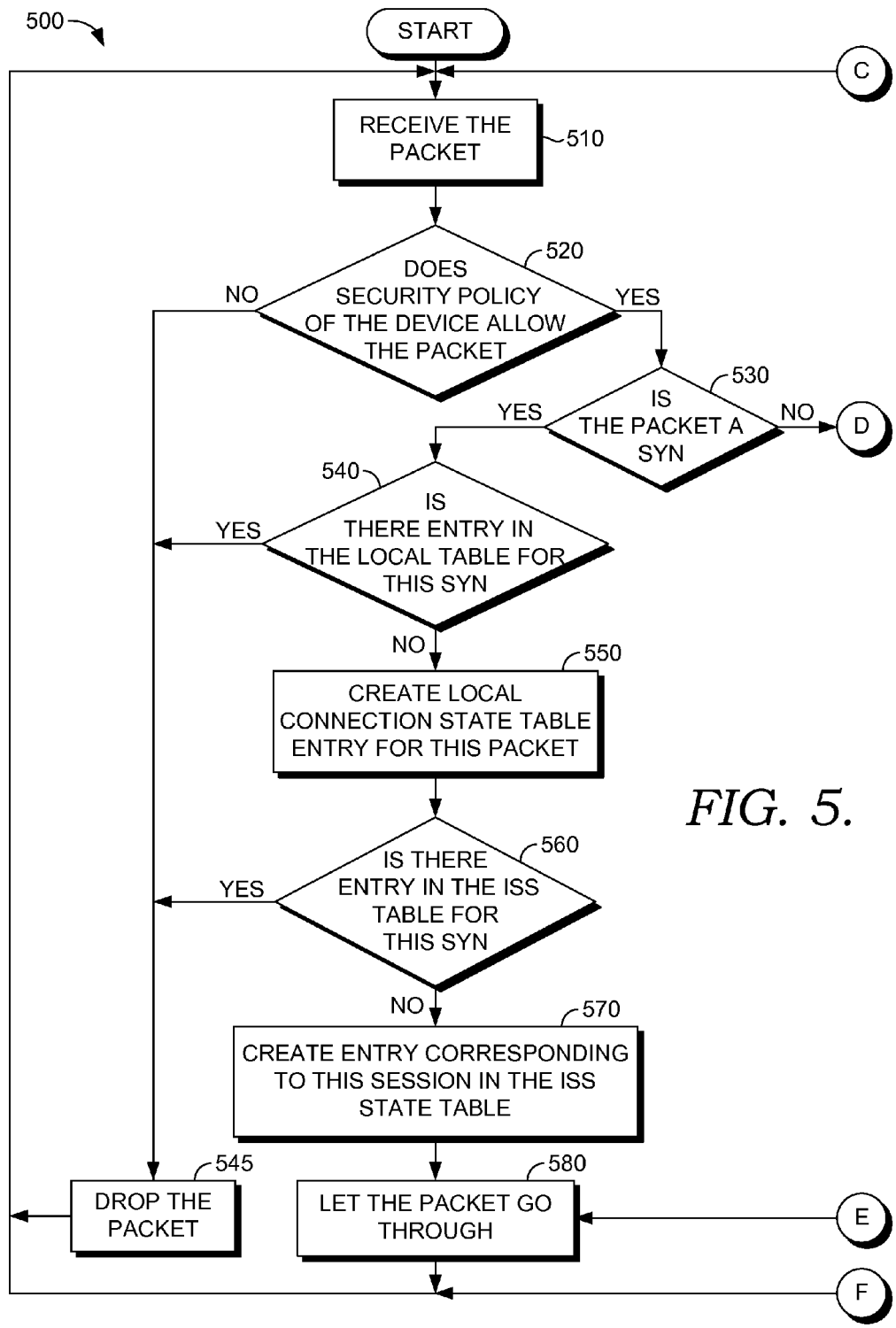
FIGS. 5, 6, 7, and 8 together depict a flow chart illustrative of an exemplary method in accordance with an embodiment of the present invention.

Referring now to FIG. 5, at a step 510, a packet is received by a security element. In embodiments of the present invention, a security element may be a computing platform, a database, or any combination of devices, systems or programs that are configured to perform tasks associated with security elements in embodiments of the present invention. A determination is made at a step 520 as to whether a security policy of the security element allows the packet. If the security policy of the security element does not allow the packet, then the packet is dropped at a step 545. At the step 520, if the security policy of the security element allows the packet, a determination is made at a step 530 as to whether the packet is a SYN message. If the packet is a SYN message, then at a step 540, a determination is made as to whether there is an entry in the local state table of the security element for this SYN message. In embodiments of the invention, the determination may be based on information contained in the SYN message and information stored in the local state table about previously received handshake messages. This may include, but is not limited to, such information as source address, destination address, sequence numbers, acknowledgement numbers, and identification of an attempted session. A local state table may be a computing platform, a database, or any combination of devices, systems or programs that are configured to perform tasks associated with a local state table in embodiments of the present invention. A local state table may be external to, incorporated within, coupled with, or otherwise communicate with, a security element.

If there is an entry in the local state table for this SYN, then the packet is dropped at the step 545. If there is no entry in the local state table for this SYN, then an entry is generated in the local state table at a step 550. At a step 560, if there is an entry in the ISS state table for this SYN, then the packet is dropped at step 545. In embodiments of the present invention, the ISS state table may be a computing platform, a database, or any combination of devices, systems or programs that are configured to perform tasks associated with an ISS state table in embodiments of the present invention. The ISS state table may be external to, incorporated within, coupled with, or otherwise communicate with, the ISS.

However, at the step 560, if it is determined that there is no entry in the ISS state table for this SYN, then an entry, corresponding to this SYN and an associated attempt to establish a session, is generated in the ISS state table, at a step 570. In embodiments of the present invention, correspondence between an entry and a handshake message may be based on an association between an attempted session and the handshake message, an association between an attempted session and an entry, or any other type of relationship between a handshake message and an entry in the local state table, as will be appreciated by one skilled in the art. At a step 580, the packet is then allowed to pass through the security element.

Figure 6:
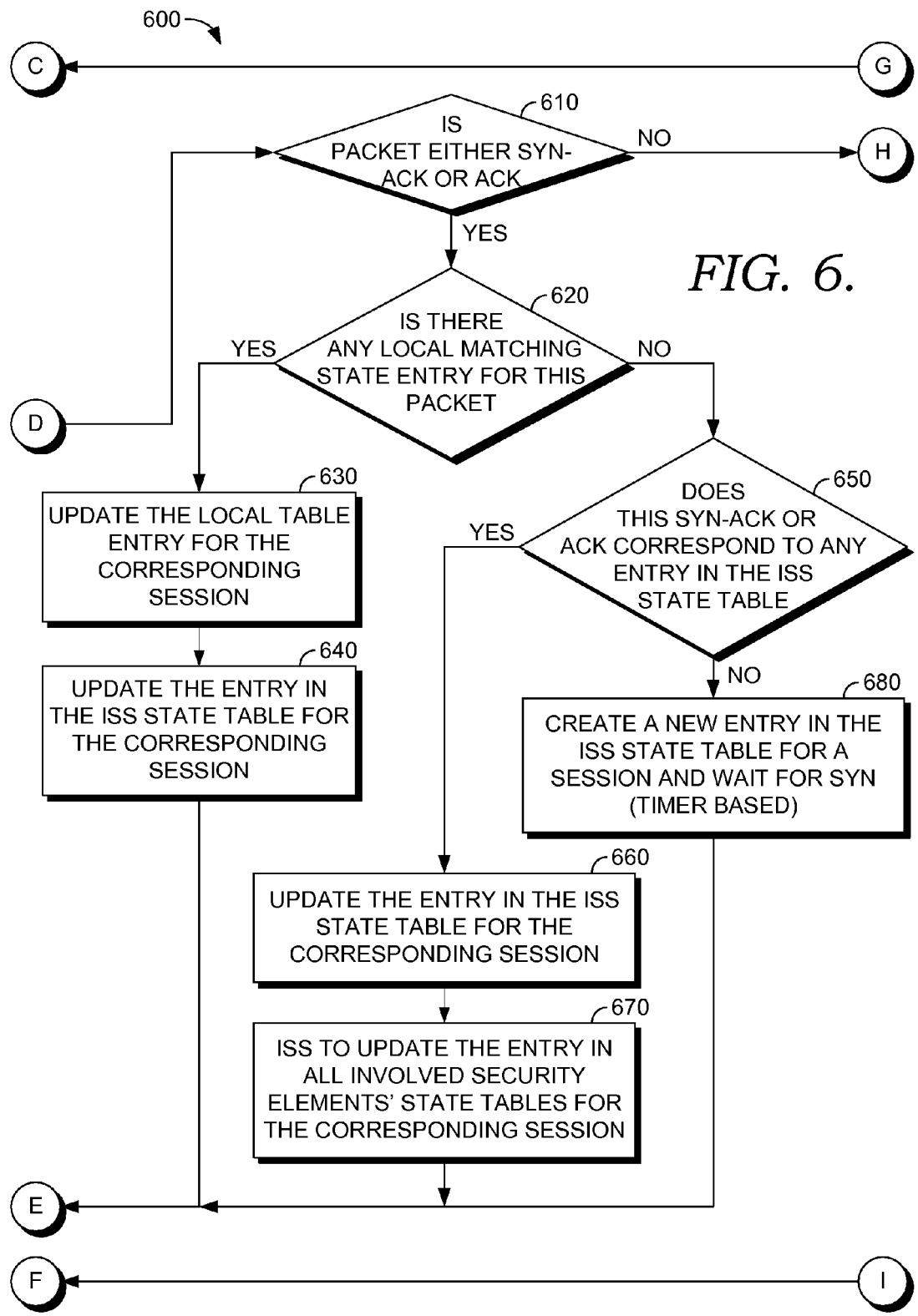

At the step 530, if it is determined that the packet is not a SYN, then at a step 610 in FIG. 6, a determination is made as to whether the packet is either one of a SYN-ACK or an ACK. If the packet is either a SYN-ACK or an ACK, then at step 620 a determination is made as to whether there is an entry corresponding to this packet in the local state table. In embodiments of the invention, the determination may be based on information contained in the SYN-ACK or ACK message and information stored in the local state table about previously received handshake messages. This may include, but is not limited to, such information as source address, destination address, sequence numbers, acknowledgement numbers, and identification of an attempted session. If there is an entry corresponding to this packet in the local state table, then the local state table entry is updated to reflect the receipt of this handshake message at a step 630. Then, at a step 640, the corresponding entry in the ISS state table is updated to reflect the receipt of this handshake message. The packet is then allowed to pass through the network at step 580 of FIG. 5.

Continuing with FIG. 6 at the step 620, if it is determined that there is no entry for this packet in the local state table, then a determination is made at a step 650, as to whether this SYN-ACK or ACK message is associated with any entry in the ISS state table. In embodiments of the present invention, associations between a handshake message and an entry in the ISS state table may be based on an attempt to establish a session. The determination may be made based on information contained in the SYN-ACK or ACK message and information received in a previous handshake notification stored in an entry in the ISS state table. This may include, but is not limited to, such information as source address, destination address, sequence numbers, acknowledgement numbers, and identification of an attempted session. Exemplary ways of tracking handshake messages and associations may include linkages, flags, updates to entries, and the like. One skilled in the art can appreciate these and various other inexhaustible ways in which to track handshake messages and associations.

If this SYN-ACK or ACK message is associated with any entry in the ISS state table, then at a step 660 the associated entry in the ISS state table is updated to reflect the receipt of this SYN-ACK or ACK message. At a step 670, for all of the security elements having entries associated with this SYN or SYN-ACK message, the ISS updates the associated entries in the security elements' local state tables. The packet is then allowed to pass through the network at step 580 of FIG. 5.

Returning to FIG. 6, at the step 650, if it is determined that the SYN-ACK or ACK is not associated with an entry in the ISS state table, then a new entry is generated in the ISS state table associated with the received SYN-ACK or ACK message and associated with an attempt to initiate a session at a step 680. Any entry in the ISS state table will be removed if an associated session is not successfully established within a certain period of time.

Figure 7:
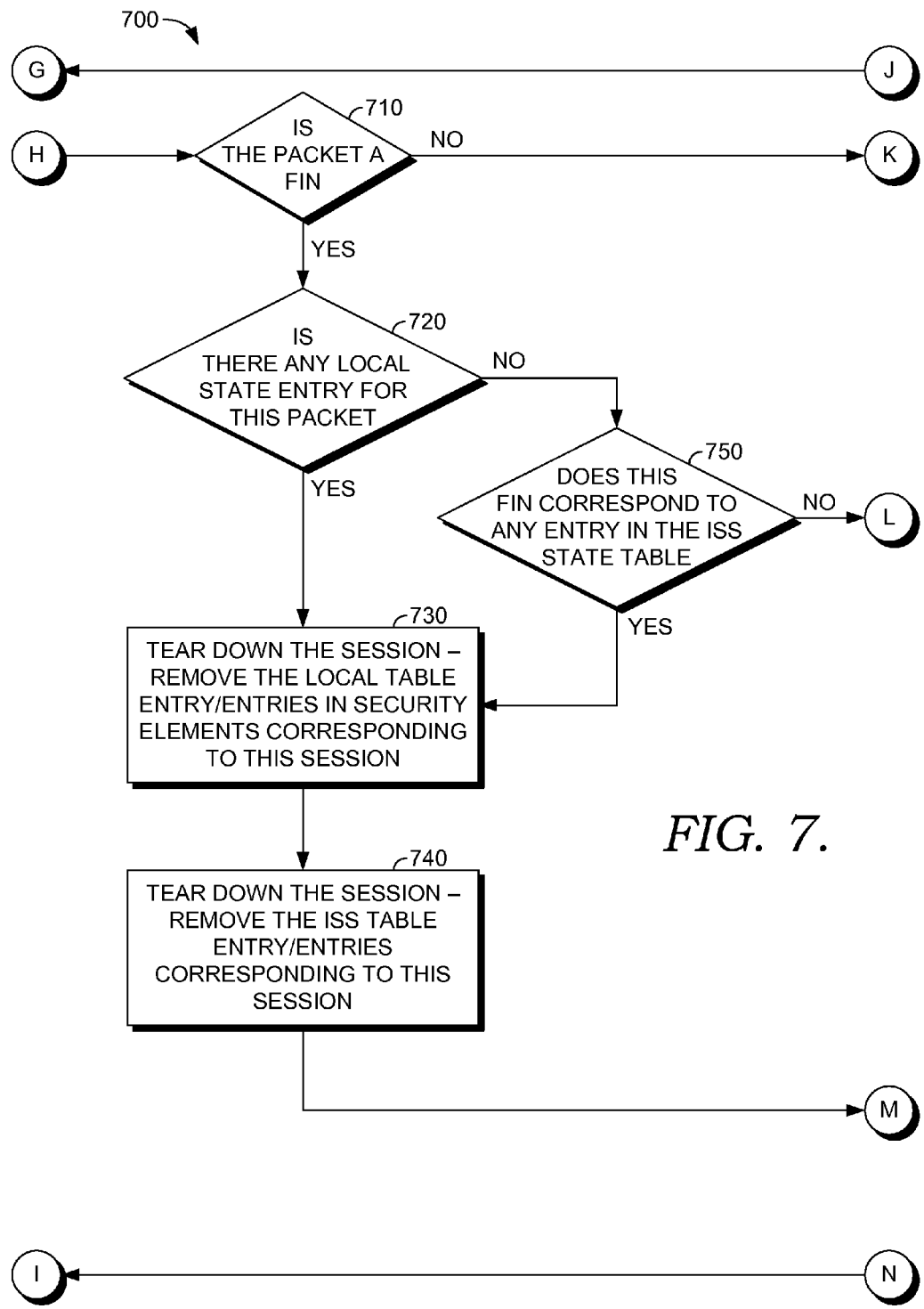

At the step 610, if it is determined that the packet is not a SYN-ACK or ACK, then at a step 710, in FIG. 7, a determination is made as to whether a packet is a FIN message. If the packet is a FIN message, then a determination is made as to whether there is any entry in the local state table associated with this packet at a step 720. If there is an entry in the local state table associated with this packet, then at a step 730, the session is terminated, the entries corresponding to the session are removed from the local state table in all security elements, and at a step 740, entries corresponding to the session are removed from the ISS state table. At a step 810 in FIG. 8, the packet is allowed to pass through the security element.

Continuing with FIG. 7, at the step 720, if it is determined that there is not an entry in the local state table for the FIN message, then a determination is made at step 750, as to whether the received FIN corresponds to an entry in the ISS state table. If the received FIN corresponds to an entry in the ISS state table, then at a step 730, the session is terminated by removing the associated entries from the local state tables in all security elements, and at step 740, the corresponding entries are removed from the ISS state table. At the step 810 in FIG. 8, the packet is allowed to pass through the security element.

Figure 8:
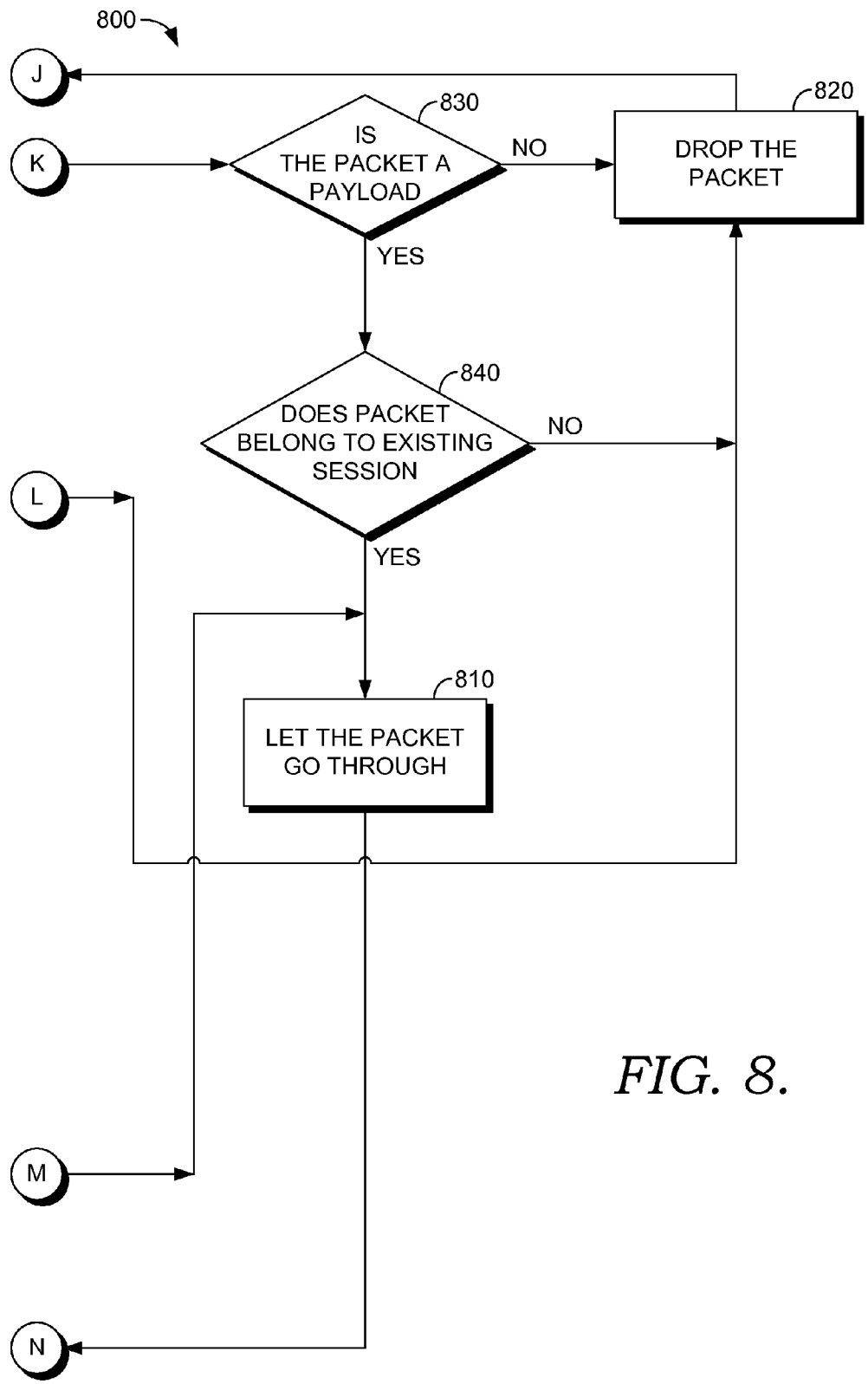

Returning to FIG. 7 at the step 750, if it is determined that the received FIN does not correspond to an entry in the ISS state table, then at a step 820, in FIG. 8, the packet is dropped and is not allowed to pass through the network. Continuing with FIG. 7 at the step 710, if it is determined that the packet is not a FIN, then at a step 830 in FIG. 8, a determination is made as to whether the packet is a payload. If the packet is a payload, then at a step 840, a determination is made as to whether the packet belongs to an existing session. If the packet belongs to an existing session, then the packet is allowed to pass through the security element at step 810.

At step 840, if it is determined that the packet does not belong to an existing session, then the packet is dropped at the step 820. At step 830, if it is determined that the packet is not a payload, then the packet is dropped at the step 820 and is not allowed to pass through the security element.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for addressing security in a TCP-based asymmetrical network having a plurality of paths, a plurality of security elements, and a centralized database, wherein each security element is coupled to at least one path, the method comprising:
   receiving at least one of a plurality of handshake messages from the plurality of security elements;
   determining that the received handshake message is new to the centralized database;
   associating the received handshake message to an existing stored entry in the centralized database,
   (A) wherein the existing stored entry in the centralized database corresponds to a previously received handshake message from one of the plurality of security elements,
   (B) wherein the association of the received handshake message to the existing stored entry in the centralized database is related to at least one of an attempted session and an allowed session, and
   (C) wherein the centralized database is configured to track the plurality of handshake messages, one or more associations of the plurality of handshake messages with one or more existing stored entries, and one or more allowed sessions;
   storing the received handshake message in the centralized database; and
   storing a determination in the centralized database that a session is allowed, based on the association of the received handshake message to the existing stored entry.

2. The method of claim 1, wherein the centralized database is further configured to communicate to at least one of the plurality of security elements the determination that the session is allowed.

3. The method of claim 2, further comprising removing an existing stored entry from the centralized database when a time period elapses prior to the determination that the session is allowed.

4. One or more nontransitory computer readable media having computer-usable instructions embodied thereon for performing a method for addressing security in a TCP-based asymmetrical network having a plurality of paths and a plurality of security elements, wherein each security element is coupled to at least one path, the method comprising:
   receiving at least one of a SYN message, a SYN-ACK message, and an ACK message from at least one of the plurality of security elements;
   determining that the received message is new to a centralized database, wherein the centralized database is operable to communicate with the plurality of security elements;
   associating the received message to one or more existing stored entries in the centralized database,
   (A) wherein the one or more existing stored entries correspond to previously received SYN, SYN-ACK and ACK messages from at least one of the plurality of security elements, and
   (B) wherein at least a first message of a group of associated SYN, SYN-ACK, and ACK messages is received from a first security element and at least a second message of the group of associated SYN, SYN-ACK and ACK messages is received from a second security element;
   storing the received message in the centralized database; and
   storing a determination in the centralized database that a session is allowed, wherein the session is based on the association of the newly received handshake message to the one or more existing stored entries.

5. The media of claim 4, wherein storing the received message in the centralized database comprises at least one of generating an entry in a state table and updating the entry in the state table.

6. The media of claim 5, wherein the centralized database is further configured to communicate to the at least one of the plurality of security elements the determination that the session is allowed.

7. A system for addressing security in a TCP-based asymmetrical network having a plurality of paths, the system comprising:
   a plurality of security elements,
   (A) wherein each of the plurality of security elements in the asymmetrical network is coupled to at least one path,
   (B) wherein each of the plurality of security elements is configured to receive at least one of a plurality of handshake messages, and
   (C) wherein a first of the plurality of security elements receives a first portion of a group of associated handshake messages and a second of the plurality of security elements receives a second portion of the group of associated handshake messages; and
   a centralized computing platform that includes one or more processing devices configured to communicate with the plurality of security elements and track the plurality of handshake messages received by the plurality of security elements,
   (A) wherein the first of the plurality of security elements communicates the first portion of the group of associated handshake messages to the centralized computing platform, and the second of the plurality of security elements communicates the second portion of the group of associated handshake messages to the centralized computing platform,
   (B) wherein the centralized computing platform is operable to determine whether a session is allowed based on associations of the plurality of handshake messages, and
   (C) wherein an association of the plurality of handshake messages is related to at least one of an attempted session and an allowed session.

8. The system of claim 7, wherein each of the plurality of security elements is further configured to determine whether the first of the plurality of handshake messages is new to a local state table, the local state table configured to couple to each of the plurality of security elements.

9. The system of claim 8, wherein each of the plurality of security elements is further configured to perform at least one of generating an entry and updating an existing entry in the local state table for the first of the plurality of handshake messages, wherein the entry is generated when the first of the plurality of handshake messages is not associated with an existing entry in the local state table, and the existing entry is updated when the first of the plurality of handshake messages is associated with the existing entry in the local state table.

10. The system of claim 9, wherein each of the plurality of security elements is configured to determine whether a session is allowed based on an association of at least one of the existing entry in the local state table and an existing entry in the centralized computing platform.

* * * * *